US008023165B2

(12) United States Patent
Wagner

(10) Patent No.: US 8,023,165 B2
(45) Date of Patent: Sep. 20, 2011

(54) LENS DEVICE COMPRISING A DISPLACEABLE LENS AND LASER SCANNING SYSTEM

(75) Inventor: Erwin Wagner, Germering (DE)

(73) Assignee: Raylase AG, Wessling (DE)

( * ) Notice: Subject to any disclaimer, the term of this patent is extended or adjusted under 35 U.S.C. 154(b) by 531 days.

(21) Appl. No.: 12/263,201

(22) Filed: Oct. 31, 2008

(65) Prior Publication Data
US 2009/0122377 A1 May 14, 2009

(30) Foreign Application Priority Data
Nov. 5, 2007 (DE) .......................... 10 2007 052 657

(51) Int. Cl.
*G02B 26/08* (2006.01)
*G02B 7/02* (2006.01)

(52) U.S. Cl. ...................... 359/210.1; 359/823; 359/824; 359/900

(58) Field of Classification Search .... 359/209.1–210.1, 359/683, 685, 806, 813–814, 822–826
See application file for complete search history.

(56) References Cited

U.S. PATENT DOCUMENTS

| | | | | |
|---|---|---|---|---|
| 5,748,394 A | * | 5/1998 | Shimazaki et al. | 359/823 |
| 7,064,912 B2 | * | 6/2006 | Yamamoto et al. | 359/824 |
| 7,126,763 B2 | * | 10/2006 | Sasaki | 359/696 |

FOREIGN PATENT DOCUMENTS

| | | |
|---|---|---|
| DE | 203 20 269 U1 | 5/2004 |
| DE | 20320269 U1 | 5/2004 |
| DE | 103 43 080 A1 | 4/2005 |
| EP | 1334822 A3 | 6/2004 |
| EP | 1657337 A1 | 5/2006 |
| WO | WO 2005/106559 A1 | 11/2005 |

OTHER PUBLICATIONS

United Kingdom Intellectual Property Office, Search Report for related application No. GB0820110.5, Date of search Feb. 11, 2009, p. 1.

* cited by examiner

*Primary Examiner* — James Phan
(74) *Attorney, Agent, or Firm* — Duane Morris LLP

(57) ABSTRACT

Shown is a lens device 16 comprising a displaceable lens 18 and a guide 42, by means of which the lens is guided so as to be capable of being displaced. The lens device 16 comprises a first and a second galvanometric motor 46a, 46b and a first and a second force transmission device 54a, 56a; 54b, 56b, which is coupled to the rotor of the first and second galvanometric motor 46a, 46b, respectively, and which is coupled to the lens 18 at a first and second junction 58a, 58b, respectively. The force transmission device is suitable to convert a rotary motion of the rotor of the first and second galvanometric motor 46a, 46b, respectively, into a displacement motion of the lens 18. The first and the second junction 58a, 58b are thereby spaced apart from one another in a direction at right angles to the displacement direction of the lens 18.

13 Claims, 4 Drawing Sheets

LENS DEVICE COMPRISING A DISPLACEABLE LENS AND LASER SCANNING SYSTEM

RELATED APPLICATIONS

The instant application claims the priority benefit of German Patent Application No. 102007052657.3 filed on 5 Nov. 2007 by the same named inventors, the entirety of which is hereby incorporated by reference.

The present invention relates to a lens device comprising a displaceable lens. The invention furthermore comprises a laser scanning system, which comprises such a lens device and the use of a lens device in scanner system.

Figure 1:
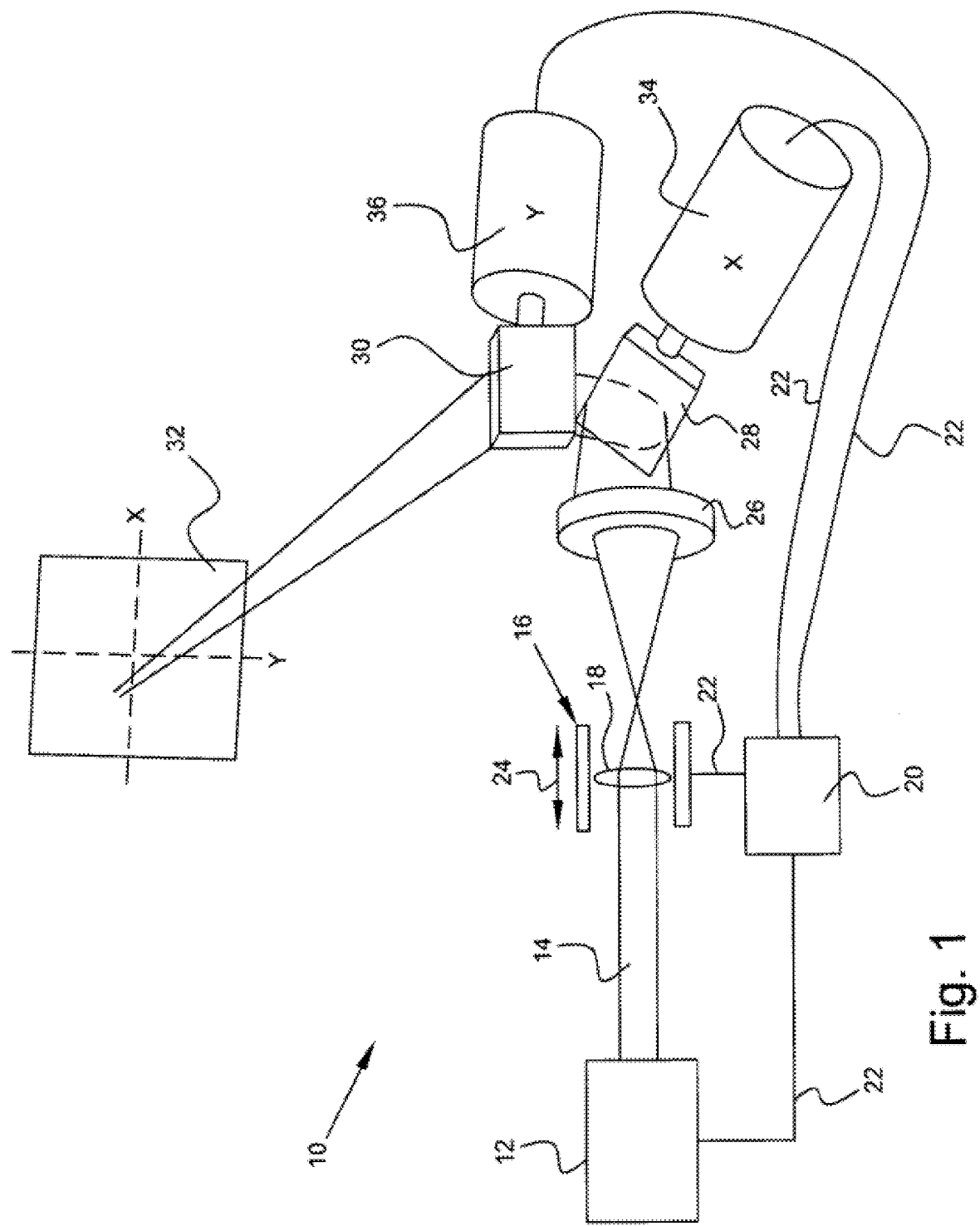

Lens devices comprising displaceable lenses are used, for example, in laser scanner systems for the purpose of focusing a laser beam depending on the impact point thereof on a target surface. For illustration purposes, a laser scanner system 10 known from the state of the art is shown in FIG. 1. The laser scanner system 10 comprises a laser 12, which generates a laser beam 14. The laser beam 14 runs through a lens device 16, which is only illustrated diagrammatically and which comprises an adjustable lens 18, which is a collimating lens in the illustrated exemplary embodiment.

A control device 20 can control the lens device 16 via a signal line 22 in such a manner that the lens 18 can be moved back and forth along the propagation direction of the laser beam 14, as is indicated by means of the double arrow 24.

The laser beam 14 further runs through an objective 26 and via a X deflection mirror 28 and a Y deflection mirror 30 onto a target surface 32, which could be a workpiece to be processed, for example, such as a film to be cut or a chip card, the surface of which is to be marked by means of the laser beam 14.

The X mirror 28 and the Y mirror 30 can be rotated in each case by means of a corresponding galvanometric motor 34 and 36, respectively. The galvanometric motors (also identified as "galvos") are also connected to the control device 20 via signal lines 22. Finally, a further signal line 22 connects the laser 12 and the control device 20.

The laser beam 14 is scanned across the target surface 32 by means of suitably controlling the galvanometric motors 34 and 36. A rotation of the X deflection mirror 28 by means of the galvanometric motor 34 thereby causes a deflection of the laser beam in X direction on the target surface 32 and a rotation of the Y deflection mirror 30 by means of the galvanometric motor 36 causes a deflection of the laser beam 14 in Y direction on the target surface 32.

The laser beam 14 is focused on the target surface 32. Due to the fact, however, that the target surface 32 is flat, the optical path length of the laser light between the objective 26 and the impact point of the laser beam 14 on the target surface changes in response to the scanning. Despite the different pathlengths, the laser beam 14 must be focused at each impact point on the target surface 32 for the purpose of processing the target surface 32. This focusing on all points of a flat target surface is also called "field-flattening".

In the system 10 of FIG. 1, the "field-flattening" is accomplished by means of the lens device 16. For each impact point on the target surface 32 there is a position of the adjustable lens 18, at which the laser beam 14 is focused in the impact point. In response to the scanning of the target surface 32, the adjustable lens 18 is thus always moved into this suitable position by means of controlling the control device 20. This type of focusing is thus also identified as real time focusing.

The term "real time focusing" already indicates that the lens device 16 must be capable of adjusting the lens on the same time scale on which the laser beam 14 is moved on the target surface 32, i.e. on the same time scale on which the mirrors 28 and 30 can be adjusted by means of the corresponding galvanometric motors 34 and 36.

The mirrors 28, 30 can be adjusted in an extremely rapid manner by means of high-capacity galvanometric motors 34 and 36 so that in practice the lens device 16 currently represents the limiting factor for the scanning speed. While a deflection mirror 28 or 30 typically weighs approximately 3 to 4 grams, the lens 18 typically weighs approximately ten times as much. The inertia of the lens 18, which is approximately ten times as much, causes the displacement of the lens 18 in the lens device 16 to lag behind in response to high accelerations of the adjustment, which is also identified as "lag error".

The problem underlying the present invention is to provide a lens device comprising a displaceable lens, where the lens can be adjusted quickly and can in particular be accelerated in quick manner.

This problem is solved by means of the lens device according to claim 1. Advantageous embodiments are identified in the dependent claims.

The lens device according to the invention comprises guiding means, through which the lens is guided so as to be capable of being displaced, a first and a second galvanometric motor and first and second force transmission devices, which are coupled with the rotor of the first and second galvanometric motor, respectively. The first and second force transmission devices are further coupled to the lens on first and second junctions, respectively, and are suitable to convert a rotary motion of the rotors of the first and second galvanometric motors, respectively, into a displacement motion of the lens, wherein the first and second junctions are spaced apart from one another in a direction at right angles to the displacement direction of the lens.

The use of two galvanometric motors for adjusting the lens has two important advantages. On the one hand, the thrust force, which is transmitted to the lens, doubles as compared to an embodiment comprising only one galvanometric motor. Due to the fact that the first the second junction, at which the galvanometric motors transmit the force, are spaced apart from one another in a direction at right angles to the displacement direction of the lens, the force is furthermore transmitted in an approximately symmetrical manner so that the lens is guided steadily even in response to a very high applied force, which is required for fast accelerations. Tests performed by the inventors have shown that for simpler embodiments comprising only one galvanometric motor as driving means the speed of the lens is not solely defined by the lack of the thrust force. The asymmetrical force transmission of high forces, as it occurs when only one galvanometric motor is used as a driving means, leads to vibrations in the lens device, which in turn are caused by the fact that the lens tilts due to the asymmetric force transmission in the guide and carries out a rocking motion. In particular this last problem represents an upper limit for the transmitted force and thus an upper limit for the speed of the lens device.

These problems can be suppressed in a highly effective manner by transmitting the force on two locations, which are spaced apart from one another at right angles to the displacement direction of the lens, and it is possible to attain displacement speeds and accelerations, which are far higher than when using lens devices comprising only one galvanometric motor.

The first and/or the second force transmission device preferably comprises an arm, which is connected to the rotor of the first and second galvanometric motor, respectively, in a torque proof manner and a guide, the one end of which is connected to the arm in an articulated manner and the other end of which is connected to the first and second junction, respectively. Such a force transmission device allows for the torque of the galvanometric motor to be converted into a thrust force in a simple manner.

It would be an obvious choice to arrange the galvanometric motors on both sides of the guide in such a manner that the free ends of the rotors of the galvanometric motors point towards the guide. The "free end of the rotor" thereby identifies the end at which the torque can be picked off, that is, the end, to which the above-mentioned arm would be fixed. However, contrary to this obvious arrangement, in a particularly advantageous embodiment the first and the second galvanometric motor are arranged next to one another and parallel to one another above and below a displacement plane. The lens is displaced in said displacement plane, wherein the respective free ends of the rotors of the galvanometric motors point in different directions. As becomes clear below with reference to the figures of an exemplary embodiment, such an arrangement is extremely space-saving and compact.

Preferably, the guide comprises at least two parallel guide rods or rails and said displacement plane is the plane, in which the guide rods or rails are arranged. In a particularly advantageous embodiment, the guide is fixed to and in particular on top of the housing of the galvanometric motors. This, in turn, leads to an extremely compact design and to a particularly rigid connection between the galvanometric motors and the guide, which, in turn, is advantageous for the smooth motion during the adjustment of the lens.

In an advantageous embodiment, the lens is held in a lens holder, which comprises at least two sliding elements, which are spaced apart from one another at right angles to the displacement direction and which are suitable to be guided so as to slide on the guide. The sliding elements thereby preferably comprise linear roll bearings.

Preferably, the center of the lens is displaced in a direction away from the galvanometric motors with reference to an imaginary connecting line between the sliding elements. This, in turn, allows for a highly compact design, where the galvanometric motors and the guide are arranged closely to one another, without the galvanometric motors hindering the displacement of the lens. Furthermore, an advantageous spatial separation between the optical path and the mechanical parts, in particular the galvanometric motors, is attained by means of this arrangement, so that they are protected against the laser radiation.

Preferably, the lens, the guide and the galvanometric motors are completely arranged in a housing. This considerably facilitates the integration of the lens device in particular into already existing systems. Due to the highly compact arrangement according to the above-described embodiments of the invention, said components can indeed be accommodated in a relatively small housing, as will be illustrated below by means of an exemplary embodiment.

In an advantageous embodiment, the invention comprises a laser scanning system comprising a deflection unit, which is suitable to scan a laser across a target surface, a lens device according to the invention or according to one of the above-described advantageous developments of the invention and a control device, which is suitable to control the lens device as a function of the impact point of the laser beam on the target surface in such a manner that the laser beam is focused on the target surface.

Further advantages and features of the invention become apparent from the following description, in which the invention is described by means of an exemplary embodiment with reference to the enclosed drawings.

Figure 2:
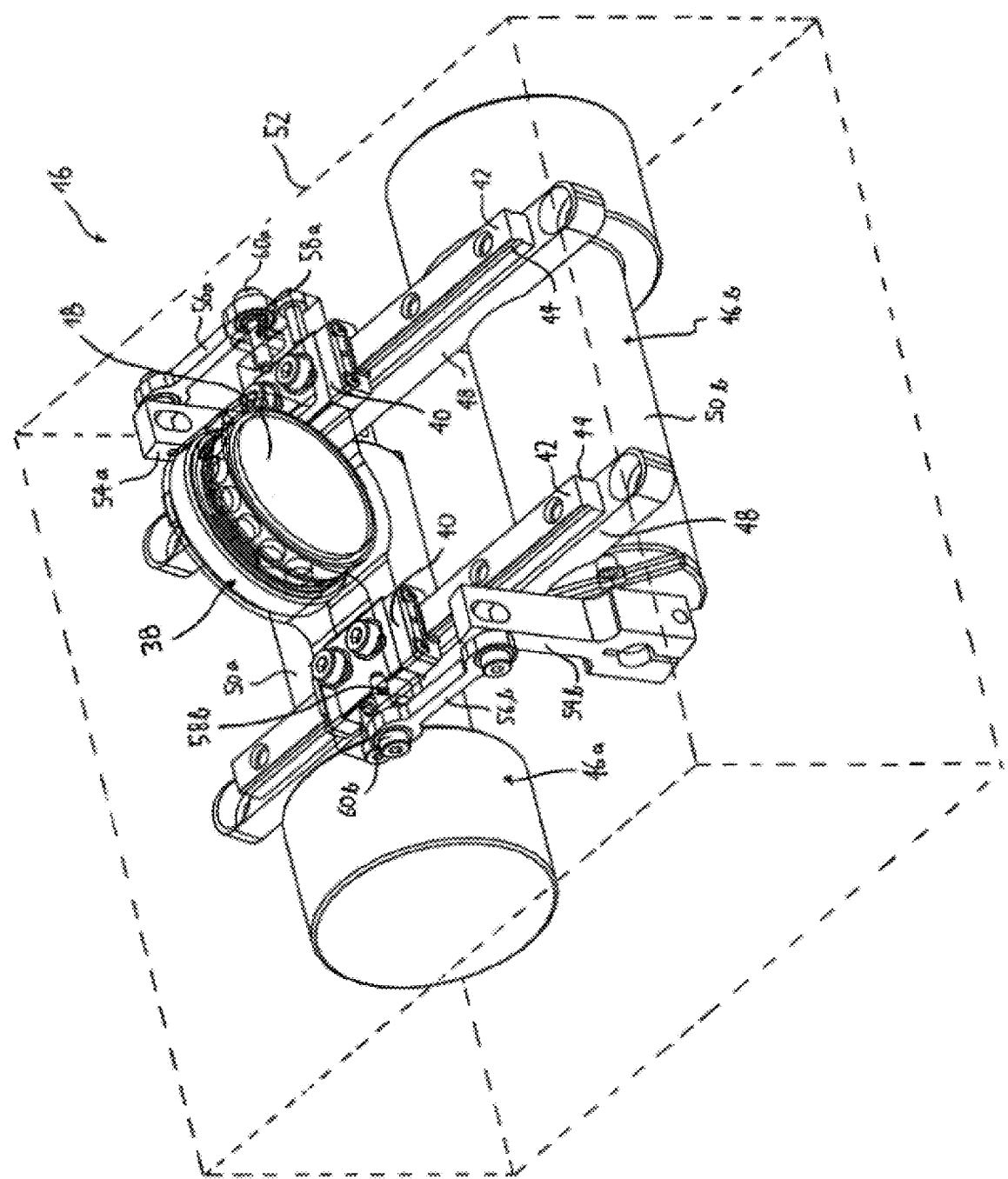
Figure 3:
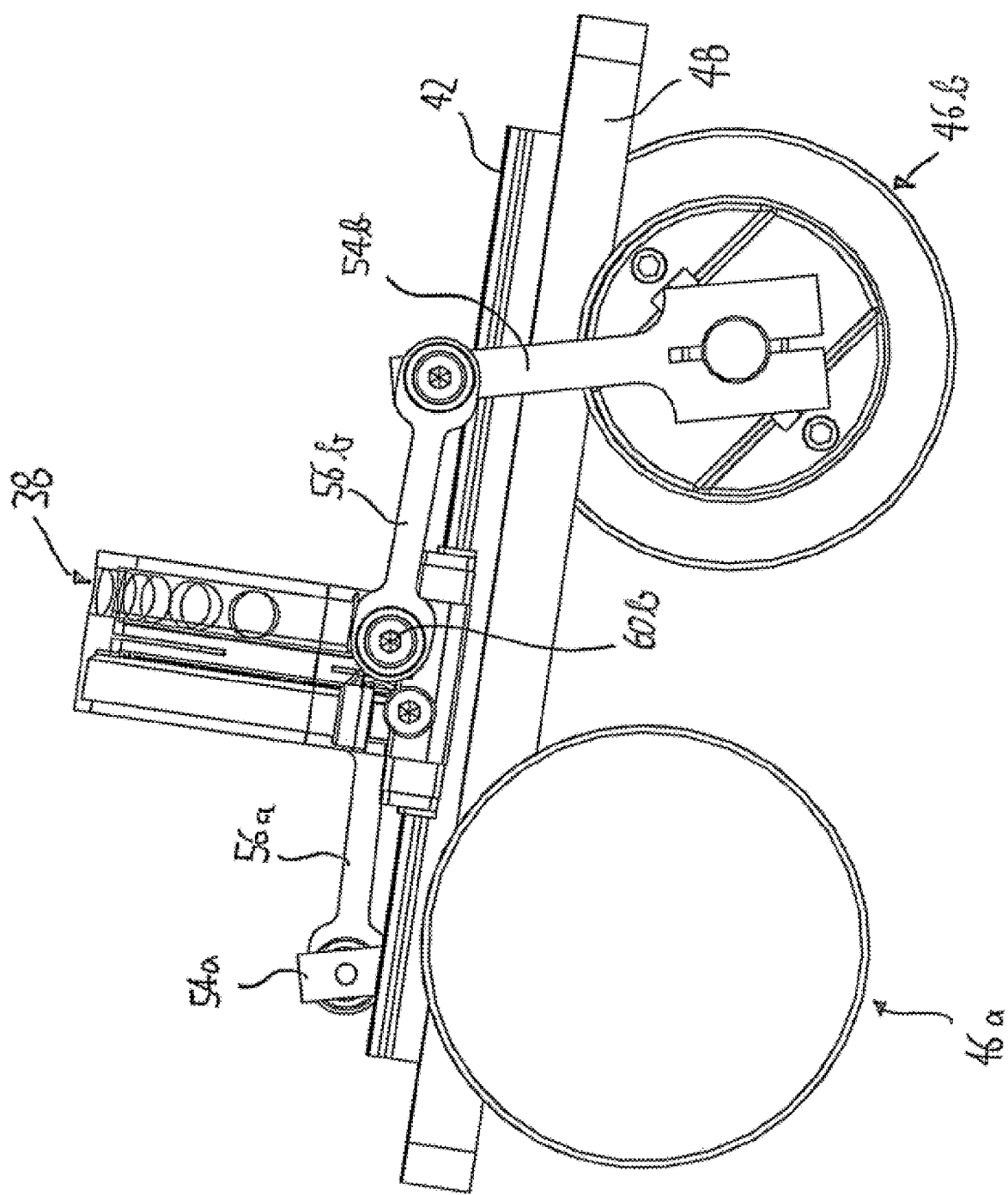
Figure 4:
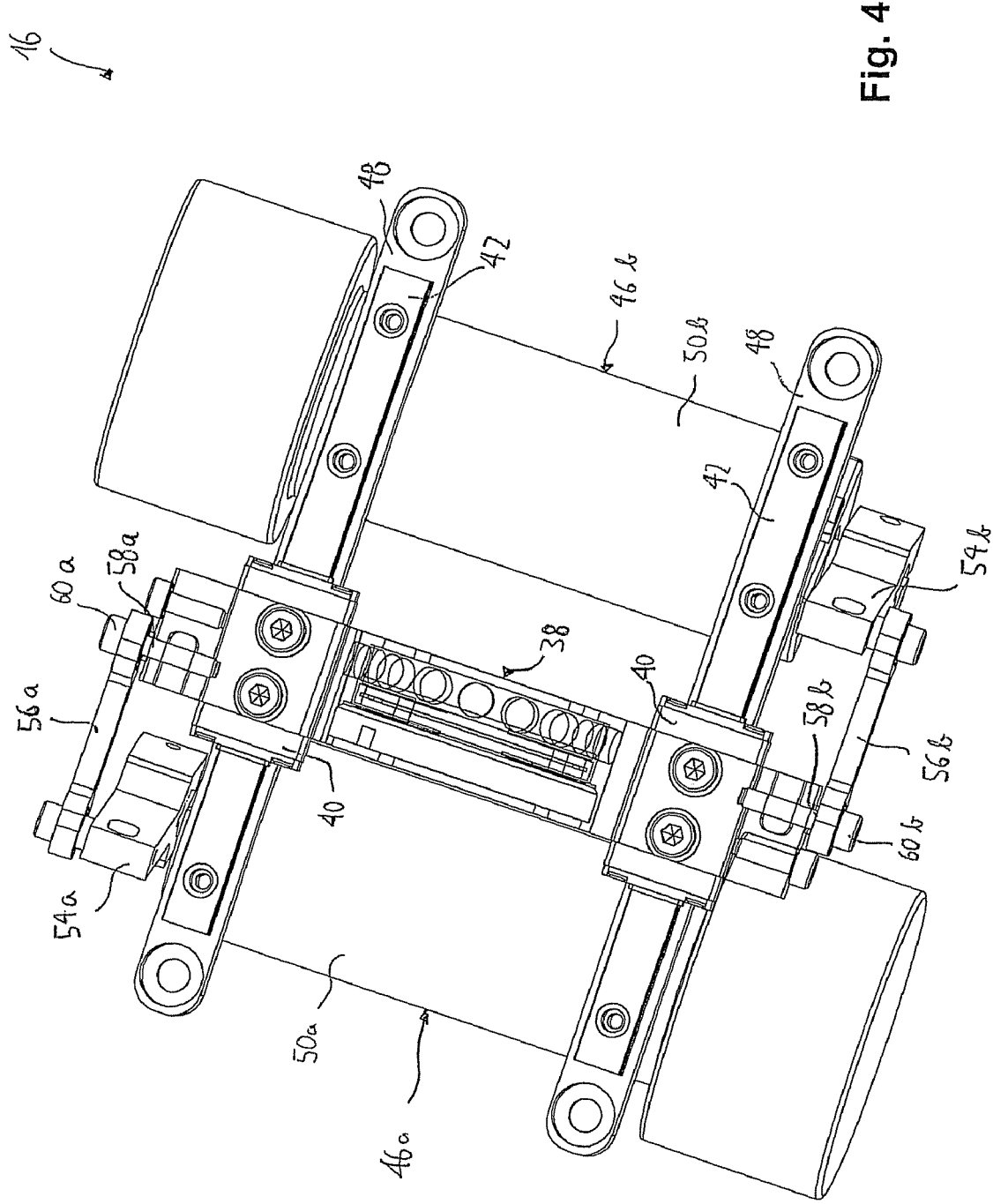

FIG. 1 shows a diagrammatic illustration of a laser scanning system according to the state of the art, FIG. 2 shows a perspective view of a lens device according to a development of the invention, FIG. 3 shows a side view of the lens device of FIG. 2 and FIG. 4 shows a top view onto the lens device of FIG. 2.

FIG. 2 illustrates a lens device 16 according to an embodiment of the invention in a perspective view. FIGS. 3 and 4 show the same lens device 16 in a side view and in a top view, respectively.

The lens device 16 comprises a lens 18, which is held in a lens holder 38. The lens holder 38 comprises a center section, in which the lens 18 is held and two lateral sections, on which sliding elements 40 are formed. The sliding elements 40 are suitable to slide along corresponding rails 42, which form a guide for the lens holder 38. The rails 42 are arranged in a plane, which will be identified below as displacement plane, so as to be parallel to one another. Grooves 44, which form a part of a ball bearing cage of a linear roll bearing (not illustrated), which is formed in the sliding elements 40, are laterally formed in the rails 42.

As can be seen in particular in FIGS. 2 and 3, the lens 18 is arranged above the displacement plane. The center of the lens 18 is in particular arranged clearly above an imaginary connecting line between the sliding elements 40.

The lens device 16 further comprises a first and a second galvanometric motor 46a, 46b. As can be seen in FIGS. 2 to 4, the galvanometric motors 46a and 46b are arranged below the displacement plane so as to be parallel to one another and next to one another, wherein the free ends of their rotors point in different directions. The rails 42 are thereby fixed on the housings 50a, 50b of the galvanometric motors 46a, 46b via subcarriers 48, which leads to a highly rigid arrangement of the rails 42 and of the galvanometric motors 46a, 46b relative to one another. Despite the structural proximity between the rails 42 and the galvanometric motors 46a, 46b, they do not hinder or obstruct the displacement motion of the lens 18, because, as is mentioned above, the lens is displaced in a direction away from the galvanometric motors 46a, 46b, i.e. upwards, with respect to an imaginary connecting line between the sliding elements 40.

The shown arrangement of the galvanometric motors 46a, 46b is extremely compact and space-saving. Actually, the entire arrangement including the galvanometric motors 46a, 46b is not much wider than the guide of the displaceable lens 18 itself, that is, than the distance of the rails 42. This allows for the entire lens device 16 to be arranged in a compact housing 52, which was omitted in the illustrations of FIGS. 3 and 4 and which is suggested only diagrammatically in FIG. 2 in a dashed manner. Preferably, the housing 52 is water-cooled so as to limit the heating in case of high laser outputs. This leads to an increased operating stability of the lens device 16. Preferably, the housing 52 is further embodied in such a manner that electronic parts (not illustrated), which are arranged on the outside of the housing 52, cannot be impacted by laser and/or scattered radiation.

The galvanometric motors 46a, 46b each have a radial arm 54a, 54b, which is connected to the galvanometric motor 46a, 46b on the free end of the respective rotor (not illustrated) of the corresponding galvanometric motor 46a, 46b so as to be torque proof. Provision is furthermore made for two links 56a, 56b, the one end of which is connected to the corresponding arm 54a, 54b in an articulated manner and the other end of which is connected to a first and second junction 58a, 58b, respectively, by means of a bolt 60a, 60b on the lens fastener 38. The arm 54a, 54b and the links 56a, 56b together form a first and second force transmission device, respectively, which transforms the torque of the corresponding galvanometric motor 46a, 46b into a thrust force.

The function of the lens device 16 of FIGS. 2 and 4 will be described below.

It is assumed that the lens 18 is to be pushed into a predetermined position. If the lens device is used in a laser scanning system as shown in FIG. 1, for example, this predetermined position can correlate with a certain impact point of the laser beam 14 of FIG. 1 on the target surface 32 and can be predetermined in such a manner that the laser beam 14 is focused in the impact point. The predetermined translative position of the lens 18 corresponds to a certain rotational position of the rotor (not shown) of the first galvanometric motor 46a. The first galvanometric motor 46a comprises a position detecting device (not illustrated), by means of which the rotational position of the rotor can be detected. A suitable current is applied via a control circuit to the windings of the first galvanometric motor 46a, by means of which the rotor is brought into the suitable position.

It goes without saying that the predetermined position of the lens 18 also corresponds to a certain rotational position of the rotor (not shown) of the second galvanometric motor 46b and, in principle, the second galvanometric motor 46b could also be controlled in such a manner that it assumes the predetermined rotational position. However, this independent control of the second galvanometric motor 46b is not used in the preferred embodiment. Instead, the same current, which was determined for controlling the first galvanometric motor 46a, is also used for the second galvanometric motor 46b, but with reversed sign, because the rotors of the galvanometric motors 46a, 46b always rotate in opposite direction in response to a displacement of the lens 18. This is not only simpler than an independent control of the second galvanometric motor 46b, but also leads to an improved and steady dynamic behavior.

When the rotors of the galvanometric motors 46a, 46b rotate according to the coil current, the rotational motion of the rotors is transferred into a translative motion of the sliding elements 40 by means of the arms 54a, 54b and by means of the links 58a, 58b. The thrust force is thereby transmitted into the sliding elements 40 and into the lens holder 38, respectively, via the bolts 60a, 60b on the first and second junction 58a, 58b, respectively. Due to the fact that these junctions 58a, 58b are spaced apart from one another at right angles to the displacement direction of the lens fastener 38, the thrust force is transmitted evenly and symmetrically and the lens holder 38 does not cant with respect to the rails 42 even in response to very high transmitted forces. In particular, the shown symmetrical force transmission causes the lens holder 38 to be guided swiftly and with low vibration even in response to high transmitted thrust forces, which are indispensable for a quick acceleration of the lens 18. The torque potential of the galvanometric motors 46a, 46b can be utilized by means of this swift and low-vibration guide and the displacement of the lens is possible on the same time scale, for example, as the adjustment of the deflection mirrors 28 and 30 of the laser scanning system 10 of FIG. 1.

Even though a preferred exemplary embodiment is disclosed and described in detail in the drawings of the preceding description, this should be considered to be purely exemplary and not limiting to the invention. It is pointed out that only the preferred exemplary embodiment is illustrated and described and that all of the changes and modifications, which presently and in the future lie within the scope of protection of the invention, are to be protected.

| List of Reference Numerals | |
|---|---|
| 10 | laser scanner system |
| 12 | laser |
| 14 | laser beam |
| 16 | lens device |
| 18 | adjustable lens |
| 20 | control device |
| 22 | signal line |
| 24 | double arrow |
| 26 | objective |
| 28 | X adjusting mirror |
| 30 | Y adjusting mirror |
| 32 | target surface |
| 34, 36 | galvanometric motors |
| 38 | lens holder |
| 40 | sliding element |
| 42 | rail |
| 44 | groove in rail 42 |
| 46a, 46b | galvanometric motor |
| 48 | intermediate part |
| 50a, 50b | housing of the galvanometric motor 46a, 46b |
| 52 | housing |
| 54a, 54b | arm |
| 56a, 56b | link |
| 58a, 58b | junction |
| 60a, 60b | bolt |

The invention claimed is:

1. A lens device having an adjustable lens, comprising:
   a guide for guiding a displacement of said lens;
   a first and a second galvanometric motors; and
   a first and a second force transmission devices which are coupled to a rotor of said first and second galvanometric motors, respectively, and which are coupled to said lens at a first and second junctions, respectively,
   wherein said first and second force transmission devices convert a rotary motion of the rotors of said first and second galvanometric motors, respectively, into a displacement motion of said lens, and
   wherein said first and second junctions are spaced apart from one another in a direction having at least a component at right angles to the displacement direction of said lens.

2. The lens device according to claim 1, wherein said first force transmission device comprises an arm which is rotationally fixed to the rotor of said first galvanometric motor and comprises a link having a first end connected to said arm in an articulated manner and a second end connected to said first junction.

3. The lens device according to claim 1 wherein said first and second galvanometric motors are arranged next to one another and parallel to one another below or above a displacement plane in which said lens is displaced, and wherein a respective free end of the rotors of said first and second galvanometric motors point in different directions.

4. The lens device according to claim 3 wherein said guide comprises at least two parallel guide rods or rails and the displacement plane is a plane in which said guide rods or rails are arranged.

5. The lens device according to claim 1 wherein said guide is fixed to a housing of at least one of said first and second galvanometric motors.

6. The lens device according to claim 1 wherein said lens is held in a lens holder which comprises at least two sliding elements which are spaced apart from one another at right angles to a displacement direction of said lens and which are slideably connected to said guide.

7. The lens device according to claim 6, wherein said sliding elements comprise linear roll bearings.

8. The lens device according to claim 6 wherein a center of said lens is displaced in a direction away from said first and second galvanometric motors with reference to an imaginary connecting line between said sliding elements.

9. The lens device according to claim 1 wherein said lens, said guide and said first and second galvanometric motors are arranged in a housing.

10. The lens device according to claim 1 further comprising a control for controlling said first and second galvanometric motors in such a manner that a first coil current, which leads to a desired position of said lens, is generated in said first galvanometric motor and a second coil current, which is inverted with respect to said first coil current, is applied to said second galvanometric motor.

11. A laser scanning system comprising: a deflection unit for scanning a laser beam across a target surface, said deflection unit comprising said lens device according to claim 1 and a control device for displacing said lens device as a function of an impact point of the laser beam on the target surface in such a manner that the laser beam is focused on the impact point.

12. A method of illuminating a target with a laser beam, the method comprising:
   (a) passing a laser beam through a lens coupled to a sliding element such that said laser beam reflects off at least one displacement mirror and illuminates a first point on a target such that said laser beam is focused on said first point;
   (b) moving said at least one displacement mirror to thereby illuminate a second point on said target; and
   (c) focusing said laser beam on said second point by:
      (i) rotating at least one of a first rotor of a first galvanometric motor and a second rotor of a second galvanometric motor;
      (ii) converting the rotary motion of said first and second rotors into linear motion of said lens, wherein said lens is displaced in a plane different than a plane containing said first and second rotors; and
      (iii) controlling the rotary motion of said first and second rotors so that said laser beam is focused on said second point.

13. The method of claim 12 wherein the step of converting the rotary motion of said first and second rotors into linear motion of said lens is accomplished via a first and a second force transmission device, wherein said first and second force transmission devices are coupled to said first and second rotors, respectively, and coupled to said sliding element at a first and a second junction, respectively, wherein said first and second junctions are spaced apart from one another in a direction having at least a component at right angles to said linear motion of said lens.

\* \* \* \* \*